United States Patent [19]

Zado

[11] 4,342,607

[45] Aug. 3, 1982

[54] SOLDER FLUX

[75] Inventor: Frank M. Zado, Lawrence Township, Mercer County, N.J.

[73] Assignee: Western Electric Company, Inc., New York, N.Y.

[21] Appl. No.: 222,417

[22] Filed: Jan. 5, 1981

[51] Int. Cl.³ ............................................. B23K 35/36
[52] U.S. Cl. ....................................... 148/23; 148/24; 148/25
[58] Field of Search ................................... 148/22–26

[56] References Cited

U.S. PATENT DOCUMENTS

| | | | |
|---|---|---|---|
| 2,471,451 | 5/1949 | Rinkeubach | 148/25 |
| 2,700,628 | 1/1955 | Rosa | 148/25 |
| 2,838,433 | 6/1958 | Ribera | 148/25 |
| 3,003,901 | 10/1961 | Marcell | 148/23 |
| 3,424,625 | 1/1969 | Tiegel | 148/23 |
| 3,436,278 | 4/1969 | Poliak | 148/23 |
| 3,459,606 | 8/1969 | Becker | 148/25 |
| 3,575,738 | 4/1971 | Becker | 148/25 |
| 3,730,782 | 5/1973 | Poliak | 148/25 |
| 3,734,791 | 5/1973 | Poliak | 148/23 |
| 3,796,610 | 3/1974 | Sarnacki | 148/25 |
| 3,915,729 | 10/1975 | Eustice | 148/23 |
| 3,944,123 | 3/1976 | Jacobs | 148/23 |
| 4,092,182 | 5/1978 | Arbib | 148/23 |
| 4,168,996 | 9/1979 | Zado | 148/23 |

*Primary Examiner*—P. D. Rosenberg
*Attorney, Agent, or Firm*—J. F. Spivak

[57] ABSTRACT

A soldering flux comprises a mixture comprising a vehicle which is nonreactive with the portion of an electronic device to be contacted by the flux, an activator having at least one halogen atom and at least one destabilizing constituent and an acid solder surfactant selected from a polybasic carboxylic acid, a hydroxyl substituent thereof, a keto acid and a mixture of any of the foregoing surfactants.

20 Claims, No Drawings

SOLDER FLUX

TECHNICAL FIELD

This invention relates to a soldering flux and more particularly, to mildly activated rosin free soldering flux.

BACKGROUND OF THE INVENTION

In soldering electronic components, circuits, equipment and the like, various kinds of fluxes are used together with soldering material so as to improve the efficiency of the soldering operation, to secure the soldered connections and to improve the long-term reliability of the connections. Conventionally, there are three broad categories of flux: (1) natural rosin, (2) activated rosin having a halogenated compound, incorporated with natural rosin, and (3) rosin free flux, generally referred to as water soluble flux.

Natural rosin flux is a stable flux but results in a solid rosin flux residue which, if not completely removed, results in serious contact resistance problems in electronic relays, connectors, gold fingers and printed wire board (PWB) circuitry. It presents few problems with respect to corrosiveness.

Activated rosin flux has a stability similar to natural rosin flux and causes little corrosion at room temperature. Fully activated fluxes have a strong fluxing action at soldering temperatures due to activators, such as an amine hydrochloride, which are typically present in high concentrations such as 1 to 10 weight percent of the resultant flux. However, the fully activated rosin flux has disadvantages in that at soldering temperatures a corrosive gas is produced. Moreover, the residues of the activated rosin combine with moisture to produce corrosive acid. Presently available fluxes containing organic amine hydrohalides, in the form of neutral salts such as glutamic acid hydrochloride, either form corrosive metal halides at elevated temperature or the residues thereof combine with moisture at room temperature to form a corrosive acid and thus are used with possible deleterious effect for electrical soldering applications.

There are also mildly activated rosin fluxes such as those taught in U.S. Pat No. 4,168,996. While these are not corrosive, they still suffer from the same disadvantage of rosin flux in that the flux residue is difficult to remove.

Rosin free fluxes are very useful in removing oxides from the metal surface to be soldered. They have the distinct advantage of being easily removed from the device by simple washing with a suitable solvent or detergent. However, there are disadvantages to their use because they contain either a free mineral acid, such as hydrochloric acid, or an inorganic salt, which hydrolyzes in water to give an acid reaction. Therefore, they are apt to destroy metallic material or to leave residues which corrode the soldered parts after soldering, resulting in decreased reliability of the soldered parts with respect to electrical and mechanical properties.

Furthermore, some rosin free fluxes comprise polyethylene glycol and many of its derivatives as flux vehicles. It has been found that such fluxes interact with the plastic surfaces of electronic devices, e.g., in printed wiring boards, to modify them so that they become more conductive, thereby increasing still further the chances of device malfunctioning. The change in substrate surface quality with regard to conduction is measurable as a decrease in insulation resistance.

Therefore, there is a need for a rosin free soldering flux composition that is noncorrosive although mildly activated and which does not adversely react with the substrate of a device to be soldered so as to degrade its insulation resistance.

SUMMARY OF THE INVENTION

This need is satisfied in accordance with the present invention by a soldering flux which comprises: (a) a vehicle that is nonreactive with the portion of the device to be contacted by the flux (b) an activator having at least one halogen atom and at least one destabilizing constituent and (c) an acid solder surfactant selected from (a') a polycarboxylic acid, (b') a hydroxyl substituent of (a'), (c') a keto acid and (d') a mixture of any of the foregoing surfactants.

The flux may further comprise a solvent and may include as part of the vehicle a high boiling point hydrocarbon.

DETAILED DESCRIPTION

The present invention is a mildly activated rosin free flux comprising a mixture of a vehicle that serves as a holding agent for the active components of the flux and is distinguishable from a solvent since it does not evaporate when subjected to high soldering temperatures, a surfactant and an activator. The flux is particularly suitable, although not limited in use, for high density electronic packaging wherein the spaces between conductors and component pins protruding through the printed circuit board are narrow. It is a highly efficient yet uniquely noncorrosive and nonreactive flux.

The term "corrosive" as used herein in describing a solder flux means that the flux either (1) leaves an ionic residue on a surface being treated therewith, which ionic residue is present in an amount sufficient to corrode the surface upon the application of electricity thereto, or (2) is acidic enough to corrode the surface to which it is applied and which typically exhibits a pH of its aqueous solution of less than 3.0 and (3) contains more than 0.06% free halide ion, such as amine hydrohalide, or more than 0.1% strong acid.

Applicant has found that certain fluxes in addition to their corrosive effect on an electronic device irreversibly modify plastic surfaces of electronic devices being soldered so that the surface itself becomes more conductive. These fluxes are said to be "reactive" with the surface. I have linked this effect to certain flux vehicles. The base material of many electronic devices is an epoxy or polyester material. At the elevated temperature necessary to solder a device the surface is transformed from a hard, partially crystalline material to an amorphous, soft, pliable mass which enters into intimate contact with the variety of chemicals used in a formulation of a typical high efficiency rosin free soldering flux. Therefore, it is not unreasonable to expect some changes in the characteristics of the surface. These changes result in a degradation of insulation resistance (IR), since electrical charge transfer (current leakage) is a function of the dielectric property of the surface material as well as its bulk. This change in IR as manifested by an enhancement of current leakage and "cross-talk" was formerly believed to be due primarily to corrosion.

In order to determine exactly which component of a typical rosin free flux causes surface modification and degradation of insulation resistance, each component of a rosin free flux was tested separately.

To measure IR, an epoxy board having a copper comb circuit pattern coated with a solder (60 weight% Sn-40 weight% Pb) is brushed with the composition to be tested. The solvent is allowed to evaporate at 25° C. and the flux-treated copper pattern is immersed in a molten solder bath (60 weight% Sn, 40 weight% Pb) for 5 seconds. The soldered bond is cooled to 77° F. and then washed with warm (110°–115° F.) isopropanol twice. The washed board is then exposed to a temperature of 95° F., a relative humidity of 90%, and a 50 V bias in an environmental chamber for 28 days. The IR is measured with a megohmeter at 4, 11 and 28 days.

The results of these tests are given in Table I.

TABLE I

Insulation Resistance (IR) Values of Typical Rosin Free Flux Components
95° F., 90° RH, 50 VDC, 28 Days

| Component | Function | IR, Mohm |
|---|---|---|
| Diethylamine hydrochloride | Activator | $10^5$ |
| Tartaric Acid | Surfactant | $10^5$ |
| Polyethylene glycol | Vehicle | $10^2$ |
| Polypropylene glycol | Vehicle | $10^5$ |
| Polyvinylisobutyl ether | Vehicle | $10^5$ |
| Polyvinyl alcohol | Vehicle | $10^2$ |
| Control (Untreated board) | — | $10^5$ |

Referring to TABLE I, it is evident that only in the cases of the polyethylene glycol (PEG) and polyvinyl alcohol vehicles were IR values seriously degraded. This fact was quite unexpected since diethylamine hydrochloride and tartaric acid are known to be corrosive and therefore were expected to degrade the IR. Obviously the diethylamine hydrochloride and tartaric acid are being completely removed by washing with water or polar solvents. In the case of PEG and polyvinyl alcohol, which are also very soluble in water, the dramatic loss of IR value suggests that PEG chemically alters the surface material, causing it to become more conductive.

It is postulated that the mechanism of PEG causing IR degradation is as follows. At the soldering temperatures used to flux electronic devices the flux including PEG readily diffuse into the softened polymer surface of the device. After cooling, the polymer solidifies and the part of the flux PEG content which had diffused into the surface becomes permanently retained there, becoming an integral part of the surface, which in turn leads to degradation of IR. Since PEG and its derivatives are nonionic, and are relatively immobile because of their molecular size, it is expected that they would not physically migrate in an electric field. It is further postulated, therefore, that they actually serve only as a charge transfer medium rather than as a charge carrier. It is still further postulated that the PEG treated epoxy or polyester surfaces re-interreact with highly ionic species, such as chloride or strong organic acids, so that there is a much greater retention of these ionic species than in the virgin material. Although a sample extract of a post soldered and cleaned device may show very little readily extractable ionic residues, generally there is no information available on how contaminated the remaining subsurface is. It is quite probable that even small amounts of retained ionic species can eventually be "extracted" from the polymer structure under the influence of high temperature, humidity and bias that typify extreme operating conditions.

When these tests were performed using polypropylene glycol instead of PEG, the results were significantly and unexpectedly different.

As can be seen in Table I, the polypropylene glycol and polyvinylisobutyl ether cause no change in IR.

It is postulated that polypropylene glycol and like substances do not lead to degradation of insulation resistance because their reactive hydroxyl sites are shielded by other organic radicals that are part of the molecular structure as compared with PEG and its like substances.

Consequently, a flux containing a vehicle having shielded reactive sites is, unexpectedly, a superior flux medium than one wherein there are sites available to react with the surface, since the former fluxes do not adversely affect the IR of the surface. A flux is said to be "nonreactive" in accordance with this invention when it does not react with the portion of the electronic device to be contacted by the flux.

A suitable vehicle is an oligomer such as polyalkyleneglycol having a branched alkylene group and having such a molecular weight as to be free flowing. Some typical branched polyalkyleneglycols include isopropyleneglycol, isobutyleneglycol and isopentyleneglycol.

Another suitable vehicle includes a polyvinylalkylether wherein the alkyl group contains from 1–5 carbon atoms, the preferred ether being polyvinylisobutylether.

Additionally, the vehicle may be substituted with a hydrocarbon having a high boiling point. The addition of hydrocarbon improves the electrical properties of the substrate and enhances the ease of removal of the flux from the device with non-polar solvents such as trichloroethane and perchloroethylene. Suitable hydrocarbons include dixylyl ethane (1,1-di(orthoxylyl) ethane), natural oils such as squalane or squalene, and/or mineral oil. When a hydrocarbon is added to the vehicle, the amount of vehicle is reduced accordingly, but in any case the percentage of vehicle should always be about at least 10%.

To the vehicle is added a suitable halogenated activator. An activator is a compound which cleans and prepares the surface to be soldered as by removing undesirable deposits, such as oxides. A suitable activator is any organic compound which contains at least one halogen atom, e.g, Cl, Br, etc., and at least one destabilizing atomic group or atom which permits the compound to decompose at or slightly below the soldering temperature employed, typically about 185° C. to 260° C. Since the halogen atom is electron withdrawing, the destabilizing group or atom should also be electron withdrawing thereby creating an instability in the compound due to the competing, e.g., opposed, electron withdrawing properties of at least two atoms or groups. Some typical destabilizing groups include the carboxyl group, carbonyl group, e.g.,

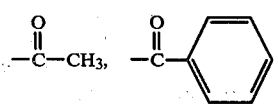

the aromatic hydrocarbon group or aryl group, e.g., phenyl, naphthyl, benzyl

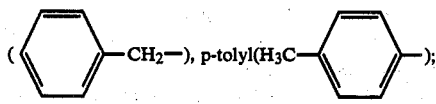

phenacyl group

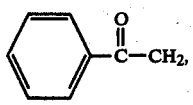

etc., and a second halogen atom, e.g., Cl, Br, etc.

The activator compound may comprise any organic compound having the following chemical structure

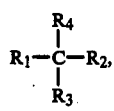

where $R_1$ is a halogen atom, $R_2$ is a destabilizing group selected from (1) the carboxyl group, (2) the aryl group, e.g., the phenyl, naphthyl, phenanthryl group, etc., the alkaryl group, the aralkyl group, the aryloxy group, (3) the carbonyl group, e.g.,

where R' is an alkyl radical, cycloalkyl radical, aryl radical, heterocyclic radical or the hydrogen atom, and (4) the halogen atom, $R_3$ and $R_4$ are the same as $R_1$ or $R_2$ or comprise an organic group or radical selected from alkyl, cycloalkyl, alkoxy and heterocyclic radicals or the hydrogen atom.

Preferred suitable activators include halogenated mono and dibasic (mono or dicarboxylic) organic acids. The acid activators have at least one halogen atom, e.g., Cl, Br, etc., preferably at the alpha position, i.e., at the carbon atom adjacent to the carboxyl group. Suitable halogenated monobasic (carboxylic) acids are those having at least 12 carbon atoms, e.g., 2-bromo-tetradecanoic acid, 2-bromo-octadecanoic acid, and typically comprise 12 to 18 carbon atoms. If the monobasic acid has less than 12 carbon atoms the resultant flux may be too acidic and/or corrosive for electronics use and it may volatilize from the flux and be lost prior to reaching the soldering temperature, e.g., typically 185° C.-260° C.

Suitable halogenated dicarboxylic (dibasic) organic acids are those having at least 4 carbon atoms, e.g., halogenated substituted succinic, adipic, pimellic acids, etc., e.g., 2,3-dibromosuccinic acid, 2-bromosuccinic acid, 2,2-dibromo-adipic acid, etc., and typically comprise 4 to 10 carbon atoms. If the dibasic acid has less than 4 carbon atoms, the resultant flux is too acidic and is corrosive.

The activator is present in the flux in an amount sufficient to remove surface deposits such as oxides. The activator is present in an amount ranging from about 0.3 to about 7 weight percent of the resultant flux mixture. If the activator is present in an amount less then about 0.3 weight percent, the activating effect thereof is insufficient. If the activator is present in an amount greater than about 7 weight percent, then residues occurring after soldering may become corrosive.

Of course, mixtures of mono and dibasic acid activators may be employed for the solder flux.

In addition to the vehicle and activator, the solder flux includes a solder surfactant. By "solder surfactant" is meant a compound which is principally added to the solder flux to aid in the spreading of the molten solder upon subsequent application thereof. The solder surfactant is a compound which improves the solder wetting rate of a surface, i.e., the surfactant enables better and more uniform spreading of molten solder across the surface to be soldered. Suitable surfactants include polybasic acids, e.g., polycarboxylic acids such as dicarboxylic and tricarboxylic acids. The dibasic acids typically have 4 to 10 carbon atoms. Suitable tricarboxylic acids typically comprise acids having 6 to 7 carbon atoms. Furthermore, dimerised and/or trimerised unsaturated, long chain aliphatic carboxylic acids are also suitable. The monomeric acids corresponding to the dimerised or trimerised acid typically have 14 to 20 carbon atoms preferably 18 carbon atoms and thus the dimerised and trimerised acids have 28 to 40 carbon atoms and 42 to 60 carbon atoms, respectively. Dimers and trimers of linoleic and oleic acids are preferred.

Other suitable surfactants include hydroxyl substituted polybasic acids, i.e., the hydroxyl substituents of the polybasic acids described above. Some typical hydroxyl substituted acids include tartaric acid and citric acid.

In addition, keto fatty acids or ketone acids, e.g., levulinic

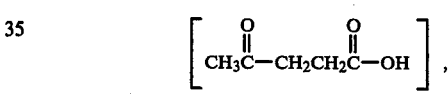

are suitable surfactants. A particular effective solder flux is one comprising a surfactant mixture of a polybasic carboxylic acid, e.g., adipic acid, combined with a keto acid, e.g, levulinic acid.

The selected surfactant is present in the mixture in an amount of at least one weight percent of the resultant mixture. If the surfactant is present in an amount less than about one weight percent then there is no surfactant effect, other than the spreading caused by the flux itself on the surface to which it is applied. An improved, uniform spreading of molten solder across the surface to be soldered is thus not attained, that is, non-wetted areas (solder dewetted) are obtained.

Although the vehicle, surfactant, activator mixture can be used as a flux without the addition of any solvent, typically the flux mixture is dissolved in a solvent carrier to form a liquid solder flux. A suitable solvent includes any solvent which is chemically inert with the vehicle, the activator and the surfactant and in which the flux mixture is soluble. Some suitable solvents include aliphatic alcohols, e.g., methanol, ethanol, isopropanol, 2-butoxyethanol, amyl alcohols, etc.; alkanolamines, e.g., ethanolamine, etc.; chlorinated hydrocarbons, e.g., perchloroethylene, trichloroethylene, etc. Where a non-flammable liquid solder flux is required, the solvent employed is a non-flammable solvent such as a chlorinated hydrocarbon, e.g., perchloroethylene, trichloroethylene, etc.

The vehicle, surfactant and activator mixture is combined with the solvent and mixed, using conventional techniques, to form a homogeneous solution. For ease in dissolution, the solvent is maintained at an elevated temperature and upon complete dissolution is cooled to room temperature.

In the preferred embodiment of the invention the solder flux comprises a vehicle, a halogenated activator, a surfactant and a solvent. Specifically, the flux mixture comprises 26 weight percent polypropylene glycol (MW 1500), 0.7 weight percent styrene dibromide, 5 weight percent azelaic acid and about 68.3 weight percent isopropanol. The terms "weight percent" and "percent by weight" as used herein means weight of a component per total weight of a mixture or a solution expressed as a percentage.

In operation the metal surface of a first member and the metal surface of a second metal surface, to be soldered and joined together, are treated with the liquid solder flux using any conventional technique, e.g., dipping, spraying, brushing, rolling, foaming, wave fluxing, etc. The solvent of the flux is evaporated and at least one of the flux treated surfaces is then treated with molten solder, again using any conventional technique, e.g., wave soldering, to form a desired solder deposit. The second metal surface is contacted to the molten solder deposit to link the surfaces and the solder deposit is cooled below the liquid temperature thereof to solder join the surfaces together.

In wave soldering, for example, the liquid solder flux is pumped continuously through a trough or other suitable vessel to form an exposed or standing wave of liquid flux or its foam. The metal surface of the first member and the second member is passed through or contacted with the standing wave of liquid flux or foam. Each member is then heated to remove the volatile constituents of the flux. A continuous stream of solder is then typically pumped up into a spout forming a head or wave of solder through which at least one of the members is passed to wet the metal surface thereof to be joined.

EXAMPLE

A glass plate was vacuum coated with 0.12 mil (120 μinches) of copper metal. Two separate drops of rosin free flux comprising 26% polypropyleneglycol (MW 1500), 5% azelaic acid, 0.7% styrene dibromide and 68.3% isopropanol, were placed thereon and left for 24 hours at 25° C. and a relative humidity of 75%. There was no copper corrosion noted, thereby indicating the noncorrosive nature of the flux.

Silver chromate paper, commercially obtained, was wetted with the flux. The paper did not change color, thereby indicating that the flux did not contain free halides and/or hydrohalides.

Five milliliters of the flux were added to 95 milliliters of distilled water. The pH was then measured to be in excess of 3.5 which indicated that the flux was not acidic enough to cause corrosion.

It is to be understood that the above-described embodiments are simply illustrative of the principles of the invention. Various other modifications and changes may be made by those skilled in the art which will embody the principles of the invention and fall within the spirit and scope thereof.

What is claimed is:
1. A rosin free solder flux which comprises:
   (a) a vehicle which is nonreactive with the portion of an electronic device to be contacted by the flux;
   (b) an activator having at least one halogen atom and at least one destabilizing substituent; and
   (c) a surfactant selected from the group consisting of (a″) a polycarboxylic acid, (b″) a hydroxyl substituent of (a″), (c″) a keto acid and (d″) a mixture of any of the foregoing surfactants wherein said activator is present in an amount of from 0.3 to 7 weight percent and said surfactant is present in an amount of at least one weight percent of the components (a), (b) and (c).

2. The flux as defined in claim 1 which further comprises a flux solvent.

3. The flux as defined in claim 1 wherein not more than 10 weight percent of the vehicle is replaced by a high boiling point hydrocarbon.

4. The flux as defined in claim 3 wherein the high boiling point hydrocarbon is mineral oil, natural oil or dixylyl ethane.

5. The flux as defined in claim 1 wherein the activator comprises a halogen substituted carboxylic acid.

6. The flux as defined in claim 1 wherein the surfactant comprises a polycarboxylic acid selected from the group consisting of dicarboxylic acid having at least 4 carbon atoms, a tricarboxylic acid having 6 to 7 carbon atoms and a mixture thereof.

7. The flux as defined in claim 2 wherein the solvent is selected from the group consisting of an aliphatic alcohol, an alkanolamine, a chlorinated hydrocarbon and a mixture of any of the foregoing solvents.

8. The flux as defined in claim 1 wherein the surfactant comprises a polycarboxylic acid selected from the group consisting of dimerised carboxylic acid having 28 to 40 carbon atoms and trimerised carboxylic acid having 40 to 60 carbon atoms and a mixture thereof.

9. The flux as defined in claim 2 wherein the vehicle is present in an amount ranging from about 10 to about 50 weight percent, the activator is present in an amount ranging from about 0.3 to about 7 weight percent, the surfactant is present in an amount of about 1 to about 15 weight percent and the solvent makes up the remainder.

10. The flux as defined in claim 1 wherein the vehicle is a polyalkyleneglycol having a branched alkylene group and a molecular weight that allows the molecule to be free flowing.

11. The flux as defined in claim 1 wherein the vehicle is a polyvinylalkylether having an alkyl group containing from one to five carbon atoms.

12. A rosin free soldering composition comprising:
   (a) a vehicle which is nonreactive with the portion of an electronic device to be contacted by the flux;
   (b) an activator having at least one halogen atom and at least one destablizing substituent selected from the group consisting of (a′) the carboxyl group, (b′) the aryl group, (c′) the carbonyl group and (d′) the halogen atom;
   (c) a surfactant selected from the group consisting of (a″) a polycarboxylic acid, (b″) a hydroxyl substituent of (a″), (c″) a keto acid and (d″) a mixture of any of the foregoing surfactants wherein said activator is present in an amount of from 0.3 to 7 weight percent and said surfactant is present in an amount of at least one weight percent of the components (a), (b) and (c); and
   (d) a metal solder alloy.

13. The soldering composition as defined in claim 12 which further comprises a solvent.

14. The soldering composition as defined in claim 12 wherein not more than 10 weight percent of the vehicle is replaced by a high boiling point hydrocarbon.

15. The composition as defined in claim 12 wherein said activator comprises a halogen substituted carboxylic acid selected from the group consisting of a monobasic acid and a polybasic acid.

16. The composition as defined in claim 12 wherein said surfactant comprises a polycarboxylic acid selected from the group consisting of a dicarboxylic acid having 4 to 10 carbon atoms, a tricarboxylic acid having 6 to 7 atoms and a mixture thereof.

17. The composition as defined in claim 12 wherein said activator comprises a halogen substituted carboxylic acid selected from the group consisting of a monocarboxylic acid having 12 to 18 carbon atoms, a dicarboxylic acid having 4 to 10 carbon atoms and a mixture thereof.

18. The composition as defined in claim 12 wherein said surfactant comprises a polycarboxylic acid selected from the group consisting of dimerised carboxylic acid having 28 to 40 carbon atoms and trimerised carboxylic acid having 40 to 60 carbon atoms and a mixture thereof.

19. The composition as defined in claim 12 wherein the vehicle is a polyakyleneglycol having a branched alkylene group and a molecular weight that allows the molecule to be free flowing.

20. The composition as defined in claim 12 wherein the vehicle is polyvinylalkylether having an alkyl group containing from one to five carbon atoms.

* * * * *